United States Patent Office 3,647,710
Patented Mar. 7, 1972

3,647,710
METHOD FOR DISPERSING FOG WITH
PHOSPHATE SALT COMPOSITIONS
Hugo Stange, Princeton, N.J., assignor to
FMC Corporation, New York, N.Y.
No Drawing. Filed Feb. 10, 1970, Ser. No. 10,315
Int. Cl. B01d 17/00
U.S. Cl. 252—319                  5 Claims

ABSTRACT OF THE DISCLOSURE

A composition useful for dispersing fog consists essentially of a buffering hygroscopic phosphate containing from 1 to 2 cations of the group consisting of sodium, potassium and ammonium for each posphorus, the phosphate particles being substantially all in a particle size range of above about 2 and under about 80 microns, the composition containing about 0.5 to 5% of a finely divided high-surface-area silica admixed therein.

BACKGROUND OF THE INVENTION

One of the major problems in maintaining airline schedules in bad weather is the occurrence and persistance of fog above and near the runways of many airports, which are often built close to water to minimize approach problems. Fogs also are a hazard to traffic on highways, particularly to fast-moving traffic along express limited-access roads. The dispersal of such fogs has been the object of considerable study, and at least one type of product has been offered commercially for the purpose of seeding the fog to induce precipitation of the droplets in the fog and hence faster break-up of the fog. These products—polyelectrolytes of proprietary composition—have some effect on fog; tests run at the Cornell Aeronautical Laboratories indicate that the fog can be dispersed somewhat more rapidly by the use of this type of product, visibility in a given time being improved by as much as a factor of almost 2, under optimum conditions. However, the treatment is too expensive to warrant its extensive use in view of the relatively small time-savings obtained. Hence, work has continued in an attempt to find cheaper and faster fog-dispersion treatments.

Work done at the Cornell Aeronautical Laboratories has demonstrated that common salt, sodium chloride, sized in the 2 to 20 micron range, will seed fog fairly effectively, hastening dispersion to improve visibility by a factor of 6 to 10. However, the harmful effect of sodium chloride on vegetation, and its corrosive effect on metal structures, have suggested the desirability of replacing the salt with other materials. Another difficulty with salt is that it is susceptible to caking at relatively low humidity, picking up water from air at humidities as low as about 70%. This results in plugging up of equipment if extreme care is not taken.

Ammonium nitrate-urea mixtures have been tried, since these do not have the harmful effect of salt. However, for good control, relatively large amounts are needed, so that application is more exensive than desirable.

OBJECTS OF THE INVENTION

This invention aims to overcome the objections to salt compositions by providing compositions which are non-corrosive, nonharmful to vegetation and far less susceptible to relative humidities not approaching 100%, while being effective fog-condensing agents at concentrations similar to those useful with sodium chloride.

STATEMENT OF THE INVENTION

I obtain these results by dispersing fog with novel compositions consisting essentially of (1) certain hygroscopic phosphates, most preferably disodium phosphate, in a particle size range substantially free of particles under about 2 microns and over about 80 microns diameter and preferably sized between about 10 to 30 microns, and (2) about 0.5 to 5%, most preferably about 1% based on the total composition, of a high-surface-area finely divided silica, most preferably a fumed silica or a finely divided silica gel. The desirable phosphates contain from 1 to 2 cations of the group consisting of sodium, potassium and ammonium for each phosphorus atom; these act to buffer the deposit from the fog to keep the pH between 4.5 and 9.0, a range which keeps the deposit from being harmful to vegetation or corrosive to aircraft.

These compositions, when used to condense fog, will do so at concentrations comparable with those needed for sodium chloride, but the compositions are not harmful to plant life, are essentially noncorrosive, and bear the great advantage over sodium chloride that they do not cake at relative humidities under about 97%, thereby giving far greater flexibility in application.

DETAILED DESCRIPTION OF THE INVENTION

It is believed that hygroscopic salts act to disperse fog by picking up water from the fog; the resultant droplets, now a concentrated solution of the salt, then act to attract more water, till they become heavy enough to drop out of the fog, and thus attenuate it.

If the salt particles are too small in size—under about 2 microns—the size of the salt solution droplets will be too small to settle, and they will stay in suspension in the fog, and actually decrease visibility. Particles larger than 30 to 40 microns settle too rapidly to be very effective; there is not sufficient time for water to transfer to the particles and form solution droplets.

Phosphate salts, as they are conventionally produced, generally have a size consist much broader than is useful in fog dispersion, so that it is necessary to classify commercial products. For example, commercial disodium phosphate may be ground mechanically to break up coarse particles, screened to get −40 micron material, and then air-classified to remove material under 2 microns in size. Such a product, when tested against 5 to 20 micron sodium chloride, gave slightly better fog control than the sodium chloride; visibility was improved by a factor of 7 as against a factor of 6 for sodium chloride. When the production fines (under 4 microns) were not removed, the disodium phosphate was somewhat worse than the sodium chloride, improving visibility by a factor of only 5.

In general, any hygroscopic phosphate can be used which will buffer the condensed fog to a pH range of 4.5 to 9.0, to produce a condensate which will not attack vegetation or corrode aircraft. Phosphates containing from 1 to 2 cations of the group consisting of sodium, potassium or ammonium, per P atom, meet these requirements, while other phosphates do not. I have successfully used monosodium phosphate, disodium phosphate, tetrapotassium pyrophosphate, sodium polyphosphate of the formula $(NaPO_3)_x$ where X is 6 to 21, tetrasodium peroxydiphosphate, and diammonium hydrogen phosphate. Mixtures of phosphates may also be used, to get precise pH control in the droplets which settle out of the fog. Best results were obtained in test with disodium phosphate; this may have been due to optimum sizing.

In order to ensure optimum workability in the fog-dispersal machines and to minimize plugging, I incorporate with my new compositions a small percentage—from about 0.5% to about 5%, and preferably about 1.0%—of a high-surface-area finely divided silica, most preferably pyrogenic silica or finely divided silica gel. This addition ensures that application will be relatively trouble-free. I have successfully used the pyrogenic silicas sold under the trade names Cab-o-Sil M–5, Cab-o-Sil H 5, Aerosil 200 and Aerosil R–932; and the finely divided silica gel Syloid 266 (average particle size −2 microns).

Testing of my new compositions has been carried out in the 600m³ test chamber of the Cornell Aeronautical Laboratories at Ashford, New York. The test methods used in the examples for comparative measurements are reported in a publication entitled "Fog Modifications with Giant Hygroscopic Nuclei" by Jiusto et al., Journal of Applied Meteorology, vol. 7 (October 1968) at pages 862, 3, and 4; these methods are hereinafter referred to as "the CAL method".

These new compositions have been dispersed from airplanes flying through or over the fog-enshrouded airports, using conventional crop-dusting, chemical dispersing equipment. Along highways or in the case of shallow low-lying fogs, the compositions may be dispersed from the ground, using conventional orchard and tree chemical dusting equipment, such as, for example, the type manufactured by FMC Corporation and known under the trademark Rotomist; which may advantageously be equipped with a flexible tube to elevate the point of dispersal.

SPECIFIC EXAMPLE OF THE INVENTION

The following specific example is given by way of illustration and not by way of limitation.

Commercial disodium phosphate — $Na_2HPO_4$ — was screened through a U.S. standard 40 mesh screen. The coarse particles were sent to a mill for reduction in size; the fines were collected, and then air-separated at an air velocity which removed substantially all of the particles below 2 microns in size. One percent of a commercial pyrogenic silica (Cab-o-Sil M–5) was then blended with the sized disodium phosphate.

This product, when subjected to testing by the CAL method, gave a maximum visibility improvement factor of 7.1, using only 5 grams of product, compared with 1.3 to 1.8 for a group of polyelectrolytes, 6.2 for a similar size consist of salt, and 7.5 for a narrower size consist (2 to 10 microns) of salt, 6.6 for urea, and 1.5 for an ammonium nitrate-urea-water composition, all at the same level of agent.

The product had great advantages over sodium chloride. It is resistant to caking up to about 97% relative humidity, whereas salt cakes at about 70% or more. The fall-out from the fog has a pH of about 8.5; it is nonharmful to vegetation and does not corrode aluminum.

Similar compositions were made by screening and air-separating the following commercial phosphates:

Monosodium phosphate
Tetrapotassium pyrophosphate
Sodium polyphosphate of the approximate composition $(NaPO_3)_{13}$
Tetrasodium peroxydiphosphate
Diammonium hydrogen phosphate, incorporating 1% of various high-surface-area silicas into the compositions, including Cab-o-Sil H 5, Aerosil 200 and Syloid 266.

All the compositions improved fog dispersion, although none was quite as good as the disodium phosphate composition.

Obviously, examples can be multiplied indefinitely without departing from the scope of the invention as defined in the claims.

What is claimed is:

1. A method for dispersing fog which consists in applying to the fog a composition consisting essentially of (1) a particulate hydroscopic phosphate salt substantially free of particles under 2 and above 80 microns, the salt containing from 1 to 2 cations of the group consisting of sodium, potassium and ammonium per phosphorus atom, and (2) 0.5 to 5% of a high-surface-area finely divided silica, based on total composition weight.

2. Methods as defined in claim 1, in which the size consist of the salt is between 2 and 40 microns.

3. Methods as defined in claim 1, in which the salt is disodium phosphate.

4. Methods as defined in claim 1, in which the silica is a pyrogenic silica.

5. Methods as defined in claim 1, in which the salt is monosodium phosphate.

References Cited

UNITED STATES PATENTS

| | | | |
|---|---|---|---|
| 2,052,626 | 9/1936 | Houghton, Jr. | 239—2 |
| 2,962,450 | 11/1960 | Elöd | 252—319 |
| 3,534,906 | 10/1970 | Gensler | 239—2 |

JOHN D. WELSH, Primary Examiner

U.S. Cl. X.R.

239—2; 252—194, 322

UNITED STATES PATENT OFFICE
CERTIFICATE OF CORRECTION

Patent No. 3,647,710          Dated 3/7/72

Inventor(s) Hugo Stange

It is certified that error appears in the above-identified patent and that said Letters Patent are hereby corrected as shown below:

Column 3, line 20 "Rotomist;" should read --Rotomist,--.

Column 4, line 22 (claim 1) "hydroscopic" should read --hygroscopic--.

Signed and sealed this 27th day of November 1973.

(SEAL)
Attest:

EDWARD M. FLETCHER, JR.       RENE D. TEGTMEYER
Attesting Officer             Acting Commissioner of Patents